(No Model.)

J. M. MATTHEWS.
MILK RECEPTACLE.

No. 513,125. Patented Jan. 23, 1894.

J. M. Matthews, Inventor

UNITED STATES PATENT OFFICE.

JAMES M. MATTHEWS, OF SEATTLE, WASHINGTON.

MILK-RECEPTACLE.

SPECIFICATION forming part of Letters Patent No. 513,125, dated January 23, 1894.

Application filed May 20, 1893. Serial No. 474,901. (No model.)

*To all whom it may concern:*

Be it known that I, JAMES M. MATTHEWS, a citizen of the United States, residing at Seattle, in the county of King and State of Washington, have invented certain new and useful Improvements in Milk-Receptacles; and I do hereby declare the following to be a full, clear, and exact description of the invention; such as will enable others skilled in the art to which it appertains to make and use the same, reference being had to the accompanying drawings, in which—

Figure 1:
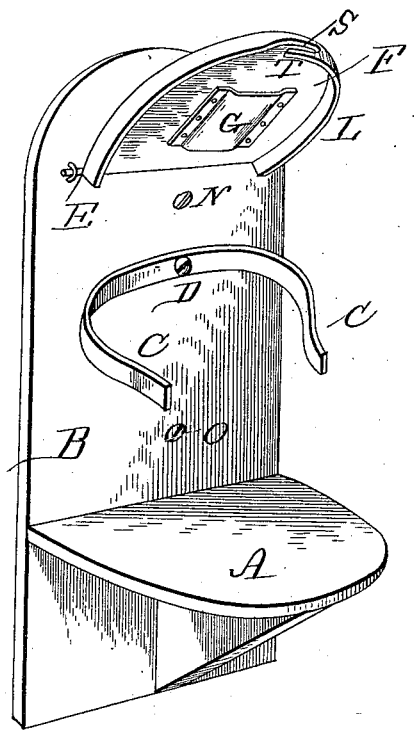
Figure 2:
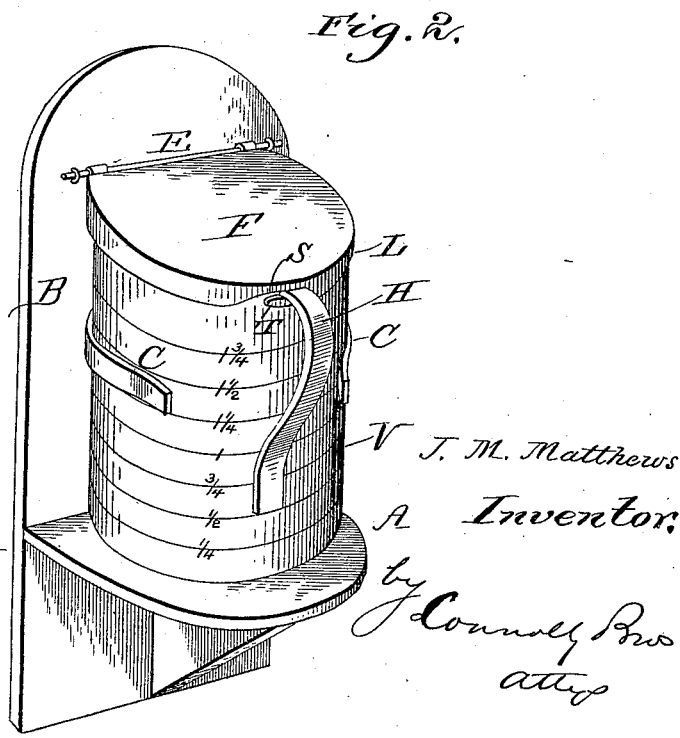

Figure 1 is a perspective view, showing the apparatus with the vessel removed. Fig. 2 shows it with the vessel in place, ready for use.

Similar letters indicate corresponding parts.

My improved milk receptacle consists of a bracket shelf A attached to an upright back B, a graduated vessel V of suitable size and material, supported upon the shelf A, and held in place by the clamp C C, and the lid or cover F.

The invention is designed to be placed outside of a house for the purpose of receiving milk or other liquid to be left for the occupants of the house; and consists of certain devices and combinations hereinafter described.

The objects of my invention are protection of the milk against the weather and other disturbing causes; convenience in using and cleansing.

A is a common bracket-shelf attached to the upright B, both made of wood, metal, or other suitable material.

C C are arms of a metal spring clamp fastened to B at D, the arms being so curved that the vessel V may be easily inserted between them by simple pressure from the front, and will then be firmly held in place. As will be seen, by reference to the drawings, the vessel may also be easily and quickly removed by simply pulling it forward. After removal it may be used for any other purpose desired.

F is a cover for the vessel, and is attached to B by means of a hinge at E. The cover F is made of galvanized iron, or other material capable of being safely exposed to the weather, and has a flange L around the edge, curved downward over the top of the vessel, the better to protect the contents against rain or dust. At S is a slot in the flange L, forming a horizontal projection or tongue T. When the cover is closed down the handle H of the vessel passes into this slot, and then by moving the handle to the right it passes over the tongue T and holds the cover down, and also holds the vessel more securely in place. Beneath the cover, and fixed thereto at G is a spring catch or other receptacle for tickets or orders.

The whole apparatus may be fixed, at any desired place, to the wall or other support by means of a screw at D, which also serves to hold in place the clamp C C; or the clamp may have a separate fastening and the supporting screws be placed at N and O.

I am aware that a graduated vessel for measuring liquids is not new; also that a bracket-shelf is not new; also that a milk-can receptacle placed in the door-way is not new; also that various receptacles have been devised which are intended to be attached to doors or gates by means of specially designed door-plates or other complicated devices. These constructions I do not claim, but

Having thus described my invention, the following is what I claim as new therein, and desire to secure by Letters Patent:

1. A milk receptacle consisting of a vessel V, with a handle H, supported on a shelf A which is attached to the upright B, the clamp C C attached to B at D, and the cover F also attached to B by a hinge at E, and having a flange L, slot S, tongue T and receptacle G, all arranged substantially as and for the purposes set forth.

2. A milk can holder consisting of an upright B, and shelf A, in combination with a clamp secured to the upright and a hinged cover provided with a slotted flange L, subtantially as described.

3. The combination in a milk receptacle of a vessel V with a shelf A for a support, the upright B, the clamp C C and the cover F attached to B by a hinge E and having a flange L, slot S, tongue T and receptacle G, all arranged substantially as and for the purposes set forth.

4. The cover F having the flange L, slot S, tongue T, and receptacle G and attached to the upright B by means of a hinge E, in combination with the clamp C and vessel V, all arranged substantially as and for the purposes hereinbefore specified.

In testimony whereof I affix my signature in presence of two witnesses.

JAMES M. MATTHEWS.

Witnesses:
CHAS. W. LOOMIS,
F. A. BELL.